United States Patent
Manion et al.

(10) Patent No.: US 7,620,902 B2
(45) Date of Patent: Nov. 17, 2009

(54) COLLABORATION SPACES

(75) Inventors: Todd R. Manion, Redmond, WA (US); Aaron W. Cunningham, Redmond, WA (US); Noah Horton, Sammamish, WA (US); Gursharan S. Sidhu, Seattle, WA (US); Sandeep K. Singhal, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 128 days.

(21) Appl. No.: 11/110,622

(22) Filed: Apr. 20, 2005

(65) Prior Publication Data

US 2006/0242581 A1 Oct. 26, 2006

(51) Int. Cl.
*G06F 3/048* (2006.01)

(52) U.S. Cl. .................. 715/758; 715/751; 715/752; 715/753; 715/757; 715/759; 715/769; 709/204

(58) Field of Classification Search ......... 715/751–753, 715/757–759, 769; 709/204
See application file for complete search history.

(56) References Cited

U.S. PATENT DOCUMENTS

| | | | |
|---|---|---|---|
| 5,854,898 A | 12/1998 | Riddle | |
| 5,917,480 A | 6/1999 | Tafoya et al. | |
| 5,987,376 A | 11/1999 | Olson et al. | |
| 6,078,948 A | 6/2000 | Podgorny et al. | |
| 6,108,687 A | 8/2000 | Craig | |
| 6,155,840 A | 12/2000 | Sallette | |
| 6,163,809 A | 12/2000 | Buckley | |
| 6,216,110 B1 | 4/2001 | Silverberg | |
| 6,237,025 B1 | 5/2001 | Ludwig et al. | |
| 6,363,352 B1 | 3/2002 | Dailey et al. | |
| 6,526,411 B1 | 2/2003 | Ward | |
| 6,636,889 B1 | 10/2003 | Estrada et al. | |
| 6,658,568 B1 | 12/2003 | Ginter et al. | |
| 6,675,205 B2 | 1/2004 | Meadway et al. | |
| 6,701,344 B1 | 3/2004 | Holt et al. | |
| 6,714,966 B1 | 3/2004 | Holt et al. | |
| 6,728,753 B1 | 4/2004 | Parasnis et al. | |
| 6,745,178 B1 | 6/2004 | Emens et al. | |
| 6,791,582 B2 | 9/2004 | Linsey et al. | |

(Continued)

FOREIGN PATENT DOCUMENTS

GB 2 378 268 A 2/2003

(Continued)

OTHER PUBLICATIONS

"Connecting and Extending Peer-to-Peer Networks," Lion Share White Paper, dated Oct. 2004, 32 pages, http://lionshare.its.psu.edu/main/info/docspresentation/LionshareWP.pdf.

(Continued)

*Primary Examiner*—Stephen S Hong
*Assistant Examiner*—Sajeda Muhebbullah
(74) *Attorney, Agent, or Firm*—Marshall, Gerstein & Borun LLP

(57) ABSTRACT

A computer implemented method and system enable users to create a social network providing access to other users. By providing access to such networks via a visual presentation, the system renders content available for access by other network members. Access is sometimes provided through propagation of metadata or other uniquely identifying indicia associated with the social network to all or at least certain other network members.

20 Claims, 7 Drawing Sheets

U.S. PATENT DOCUMENTS

| | | | |
|---|---|---|---|
| 6,801,604 | B2 | 10/2004 | Maes et al. |
| 6,968,179 | B1 | 11/2005 | De Vries |
| 7,124,164 | B1* | 10/2006 | Chemtob .................... 709/204 |
| 7,130,884 | B2* | 10/2006 | Maehiro ...................... 709/206 |
| 7,234,117 | B2* | 6/2007 | Zaner et al. ................. 715/758 |
| 7,250,955 | B1* | 7/2007 | Beeman et al. ............ 345/592 |
| 2001/0035976 | A1 | 11/2001 | Poon |
| 2001/0053213 | A1 | 12/2001 | Truong et al. |
| 2002/0073204 | A1 | 6/2002 | Dutta et al. |
| 2002/0097267 | A1 | 7/2002 | Dinan et al. |
| 2002/0140730 | A1 | 10/2002 | Linsey et al. |
| 2002/0143989 | A1 | 10/2002 | Huitema et al. |
| 2002/0154172 | A1 | 10/2002 | Linsey et al. |
| 2002/0184358 | A1 | 12/2002 | Traversat et al. |
| 2003/0014485 | A1 | 1/2003 | Banatwala |
| 2003/0036941 | A1 | 2/2003 | Leska et al. |
| 2003/0055892 | A1 | 3/2003 | Huitema et al. |
| 2003/0088544 | A1 | 5/2003 | Kan et al. |
| 2003/0088570 | A1* | 5/2003 | Hilbert et al. ............... 707/100 |
| 2003/0126027 | A1 | 7/2003 | Nelson et al. |
| 2003/0135629 | A1 | 7/2003 | Sasaki et al. |
| 2003/0217073 | A1 | 11/2003 | Walther et al. |
| 2004/0078436 | A1 | 4/2004 | Demsky et al. |
| 2004/0082351 | A1 | 4/2004 | Westman |
| 2004/0088325 | A1 | 5/2004 | Elder et al. |
| 2004/0111423 | A1 | 6/2004 | Irving et al. |
| 2004/0117446 | A1 | 6/2004 | Swanson |
| 2004/0122898 | A1 | 6/2004 | Srinivasa |
| 2004/0122901 | A1 | 6/2004 | Sylvain |
| 2004/0128350 | A1 | 7/2004 | Topfl et al. |
| 2004/0141005 | A1 | 7/2004 | Banatwala et al. |
| 2004/0143603 | A1* | 7/2004 | Kaufmann et al. ....... 707/104.1 |
| 2004/0172455 | A1 | 9/2004 | Green et al. |
| 2004/0172456 | A1 | 9/2004 | Green et al. |
| 2004/0184445 | A1 | 9/2004 | Burne |
| 2004/0249970 | A1 | 12/2004 | Castro et al. |
| 2004/0260771 | A1 | 12/2004 | Gusler et al. |
| 2005/0009537 | A1 | 1/2005 | Crocker et al. |
| 2005/0027805 | A1 | 2/2005 | Aoki |
| 2005/0038856 | A1 | 2/2005 | Krishnasamy et al. |
| 2005/0066001 | A1 | 3/2005 | Benco et al. |
| 2005/0080859 | A1 | 4/2005 | Lake |
| 2005/0102245 | A1 | 5/2005 | Edlund et al. |
| 2005/0102356 | A1 | 5/2005 | Manion et al. |
| 2005/0171799 | A1 | 8/2005 | Hull et al. |
| 2005/0172001 | A1* | 8/2005 | Zaner et al. ................. 709/205 |
| 2005/0198031 | A1* | 9/2005 | Pezaris et al. ................... 707/9 |
| 2005/0198173 | A1 | 9/2005 | Evans |
| 2005/0235038 | A1 | 10/2005 | Donatella et al. |

FOREIGN PATENT DOCUMENTS

| | | |
|---|---|---|
| JP | 2002197246 | 11/2001 |
| WO | WO 01/20450 A1 | 3/2001 |
| WO | WO-2004009550 A1 | 7/2004 |

OTHER PUBLICATIONS

"IBM Workplace Collaboration Services Overview Guide" dated Jan. 2005, 2 pages. (Printed from ftp://ftp.lotus.com/pub/lotusweb/IGM_Workplace_collaboration_services_g224733301_118.pdf on Jul. 1, 2005).

"Presence and Awareness Services," Ramiro Liscano, Professor, SITE, University of Ottawa, 89 pages, http://www.site.uottawa.ca/-rliscano/tutorials/PresenceAwarenessServices.pdf.

"Publication Related to Pastry," http://research.microsoft.com/~antr/Pastry/pubs.htm.

The Gnutella Protocol Specification vo.4, http://www.clip2.com.

About Presentation Broadcasting, 3 pages printed Jul. 1, 2005 from http://office.microsoft.com/en-us/assistance/HP052411931033.aspx.

Castro et al., "Secure Routing For Structured Peer-to-Peer Overlay Networks," Usenix, OSDI '02 Paper (OSDI '02 Tech Program Index) pp. 299-314 of the Proceedings, Fifth Symposium on Operating Systems Design and Implementation (OSDI 2002) 33 pages, http://www.usenix.org/events/osdi02/tech/full_papers/castro/castro_html/.

Castro et al., "Topology-Aware Routing In Structured Peer-to-Peer Overlay Networks," Technical Report MSR-TR-2002-82, Microsoft Research, Microsoft Corporation, http://www.research.microsoft.com.

Cheung, " Chatopus for Palm OS, Using IM Bots for Jabber," Chatopus-Palm OS Instant Messaging Client for XMPP/Jabber, Dated Oct. 20, 2002 (Last updated: Jun. 25, 2005), 6 pages, http://www.chatopus.com/articles/bots.html.

Dabek, F., et al., Building Peer-to-Peer Systems With Chord, a Distributed Lookup Service, at MIT Laboratory for Computer Science, 6 pages, at http://pdos.lcs.mit.edu/chord.

Druschel, P., et al., PAST: A large-scale, persistent peer-to-peer storage utility, at Rice University and Microsoft Research, 6 pages.

Ellison, C., et al., Simple Public Key Certificate, (Internet Draft 1999), at http://www.world.std.com/~cme/spki.txt (Aug. 6, 2001).

Ellison, C., et al., SPKI Certificate Theory, (The Internet Society 1999), at http://www.ietf.org/rfc/rfc2693.txt?number=2693 (Aug. 6, 2001).

Ellison, C., SPKI Requirements, (The Internet Society 1999), at http://www.ietf.org/rfc/rfc2692.txt?number=2692 (Aug. 6, 2001).

Erdelsky, P., The Birthday Paradox, EFG, at http://www.efgh.com/math/birthday.htm (Mar. 8, 2002).

Handley et al., "SIP: Session Initiation Protocol," Network Working Group, Request for Comments 2543, pp. 1-153 (Mar. 1999).

Lai, K. et al., Measuring Link Bandwidths Using a Deterministic Model of Packet Delay, at Department of Computer Science at Stanford University, 13 pages.

Langley, A., The Freenet Protocol, The Free Network Project, at http://freenet.sourceforge.net/index/php?page=protocol (May 21, 2001).

MeetingMaker—Meeting Maker printout, 2 pages printed on Jul. 1, 2005 from http://www.meetingmaker.com/products/meetingmaker/default.cfm.

MeetingMaker—WebEvent Publish printout, 2 pages printed on Jul. 1, 2005 from http://www.meetingmaker.com/products/webevent_publish/default.cfm.

QuickTime Broadcaster (3 pages) printed Jul. 1, 2005 from http://www.apple.com/quicktime/broadcaster/.

Red-Black Tree, National Institute of Standards and Technology, at http://www.nist.gov/dads/HTML/redblack.html (Mar. 5, 2002).

Rowstron et al., Pastry: Scalable, distributed object location and routing for large-scale peer-to-peer systems, at Microsoft Research, Ltd., St. George House and Rice University, 20 pages.

Rowstron et al., SCRIBE: The design of a large-scale event notification infrastructure, at Microsoft Research, Ltd., St. George House and Rice University, 20 pages.

Rowstron et al., Storage management and caching in PAST, a large-scale, persistent peer-to-peer storage utility, at Microsoft Research, Ltd., St. George House and Rice University, 14 pages.

SlidesNow! (3 pages) printed Jul. 1, 2005 from http://www.slidesnow.com/about.shtml.

The Best Way to Centrally Deploy Applications and Provide On-Demand Access, 2 pages printed Jul. 1, 2005 from http://www.citrix.com/English/ps2/products/product.asp?contentID=186.

Tyson, "How the Old Napster Worked," http://computer.howstuffworks.com/napster.htm/printable.

Zhao, et al., "A Web Based Multi-Display Presentation System," 2 pages printed Jul. 1, 2005 from http://www.fxpal.com/publications/FXPAL-PR-04-303.pdf.

Bouvin, "Designing User Interfaces for Collaborative Web-Based Open Hypermedia," in *Proceedings of the Eleventh ACM Conference on Hypertext and Hypermedia*, pp. 230-231 (San Antonio, TX, 2000).

Boyer et al., "Virtual Social Clubs: Meeting Places for the Internet Community," *IEEE International Conference on Multimedia Computing and Systems*, pp. 297-301 (Florence, Italy, Jun. 7-11, 1999).

Cheng et al., "Hutchworld: Lessons Learned. A Collaborative Project: Fred Hutchinson Cancer Research Center & Microsoft Research," *in Proceedings of Second International Conference on Virtual Worlds (VW 2000)*, pp. 1-2 (Paris, France, Jul. 5-7, 2000). http://research.microsoft.com/scg/papers/hutchvw2000.pdf.

Cugola et al., "Peer-to-Peer for Collaborative Applications," *in Proceedings of the 22nd International Conference on Distributed Computing Systems Workshops (ICDCS'02)*, pp. 359-364 (Vienna, Austria, Jul. 2-5, 2002).

Dorohonceanu et al., "A Desktop Design for Synchronous Collaboration," *in Proceedings of the Graphics Interface '99 (GI'99)*, pp. 27-35 (Kingston, Ontario, Canada, Jun. 1999).

Duhr, "Oberflächenelemente in interaktiven und kooperativen anwendungen," Universität Oldenburg, Department of Information Systems Thesis (Aug. 2000).

Farnham et al., "Supporting Sociability In A Shared Browser," *In Proceedings of Interact Conference* (Tokyo, Japan, Jul. 2001). http://research.microsoft.com/scg/papers/sharedbrowsinginteract.pdf, pp. 1-8.

García et al., "Extending a Collaborative Architecture to Support Emotional Awareness," *EBAA '99—Workshop on Emotion-Based Agent Architectures*, pp. 46-52 (May 2, 1999).

Greenberg et al., "Using a Room Metaphor to Ease Transitions in Groupware," University of Calgary, Department of Computer Science, *Research Report* 98/611/02, 31 pages (1998).

Greenberg, "Collaborative Interfaces for the Web," *in Human Factors and Web Development*, (Forsythe et al., eds.) Chapter 18, pp. 241-253, LEA Press, (1997).

Gutwin, "Workspace Awareness in Real-Time Distributed Groupware," The University of Calgary, Department of Computer Science, Ph.D. Thesis, 270 pages (Dec. 1997).

Kindberg, "Mushroom: A Framework for Collaboration and Interaction Across the Internet," *in Proceedings of the Fifth ERCIM Workshop on CSCW and the Web* (St. Augustin, Germany, Feb. 1996).

Kollock, "The Economies of Online Cooperation: Gifts and Public Goods in Cyberspace," *in Communities in Cyberspace*, (Smith et al., eds.), pp. 1-17 (Routledge, London, UK, 1999). http://www.sscnet.ucla.edu/soc/faculty/kollock/papers/economies.htm.

Kollock et al., "Managing The Virtual Commons: Cooperation and Conflict in Computer Communities," *in Computer-Mediated Communication: Linguistic, Social, and Cross-Cultural Perspectives*, (Herring, ed.), pp. 109-128 (John Benjamins, Amsterdam, Netherlands, 1996) http://research.microsoft.com/scg/papers/KollockCommons.htm.

Lee et al., "Supporting Multi-User, Multi-Applet Workspaces in CBE," *In Proceedings of the ACM 1996 Conference on Computer Supported Cooperative Work*, pp. 344-353 (Cambridge, MA, 1996).

Schmidt et al., "A Generic System for Web-Based Group Interaction," *in Proceedings of the Thirty-First Hawaii International Conference on System Sciences*, vol. 1, pp. 545-554 (Kohala Coast, HI, Jan. 6-9, 1998).

Smith et al., "The Social Life of Small Graphical Chat Spaces," *in Proceedings of the SIGCHI Conference on Human Factors in Computing Systems*, pp. 462-469 (The Hague, Netherlands, Mar. 2000). http://research.microsoft.com/scg/papers/vchatchi2000.pdf.

Smith et al., "What Do People Do in Virtual Worlds? An Analysis of V-Chat Log File Data," Microsoft Corporation Report (Apr. 1, 1998). http://research.microsoft.com/scg/papers/kollockv-chat.pdf.

"IBM Lotus Instant Messaging and Web Conferencing," *IBM Software—IBM Lotus Instant Messaging and Web Conferencing home page* (3 pgs.).

"Design Explorations," *IBM Research: Social Computing Group* (4 pgs.).

"At What Cost Pervasive? A Social Computing View of Mobile Computing Systems," *IBM Research: vol. 38, No. 4, 1999, Pervasive Computing* (28 pgs.).

* cited by examiner

COLLABORATION SPACES

TECHNICAL FIELD

This invention relates to communication and interaction over a computer network. More particularly, the invention is directed to a system and method for defining a social network user interface to facilitate interactions and data availability among defined groups of two or more communicating entities.

BACKGROUND OF THE INVENTION

The popularity of the Internet and other networks has caused a migration of various interactions and tasks from the physical world to the digital world. For example, documents and files that would in years past have been shared by sharing physical copies to other members in a group are now often handled electronically and transmitted digitally over a network. In such exchanges between members of a group, it is important to maintain a degree of control over access by various group members, particularly when the group is collaborating with each other.

With the coming of the digital age, one activity that has not migrated strongly from the physical world to the digital one has been group interaction. In our daily lives, we interact with people on a regular basis, and form social groups that we engage with on a variety of activities over time. However, within any social group, information is sometimes shared with less than all of the group members or even maintained in private. Everyone in the social group knows about every one else, and these groups grow and change over time. This metaphor that exists in our daily lives has not translated into the digital world.

While a number of mechanisms and forums for digital communication between remote parties now exist, none of these has provided a compelling solution that can lead to widespread use. The existing communications mechanisms fail to now provide a user interface that is intuitive and easy to use. For example, these technologies do not provide a true group space within which group members may readily know whether other group members are present, access shared files and engage in other group activities. Instead, many existing technologies tend to focus on a single activity or endeavor, such as gaming or file sharing, rather than on the group and its activities and communication. Other technologies allow group chatting, but have no true sense of groups, requiring setup of the group each time a group chat is attempted, and providing no mechanism for transitioning the group to an activity other than pure chatting without again manually setting the group up at the next activity.

Accordingly, there remains a need to facilitate group interaction through which a desired group of users can interact with each other in a secured environment, and through which users can access, and maintain control with respect to files shared in their shared relationships with one another.

SUMMARY OF THE INVENTION

The present invention is directed to a method and system for presenting a social network to a user through a graphical interface. The invention presents group activities associated with the social network that may be implemented across network topologies to facilitate group interaction within the social network.

The invention provides a system and method for visually presenting a social network such that user may activate management tasks and items. Such action includes various operations that are performed with respect to group activities within the network, among other things. Upon creation of the social network, other users can access and/or receive notifications concerning group activities, and perform other social interactions such as join in interactive sessions or collaborate on shared data files. This provides a clear sense of user operations that are available for group activities, to thereby create an ease of use of group spaces.

With the use of a browser interface, items within a social network may be managed quickly and effectively. In this way, other applications can readily access content within the social networks defined by the user.

DETAILED DESCRIPTION OF THE INVENTION

Figure 1:
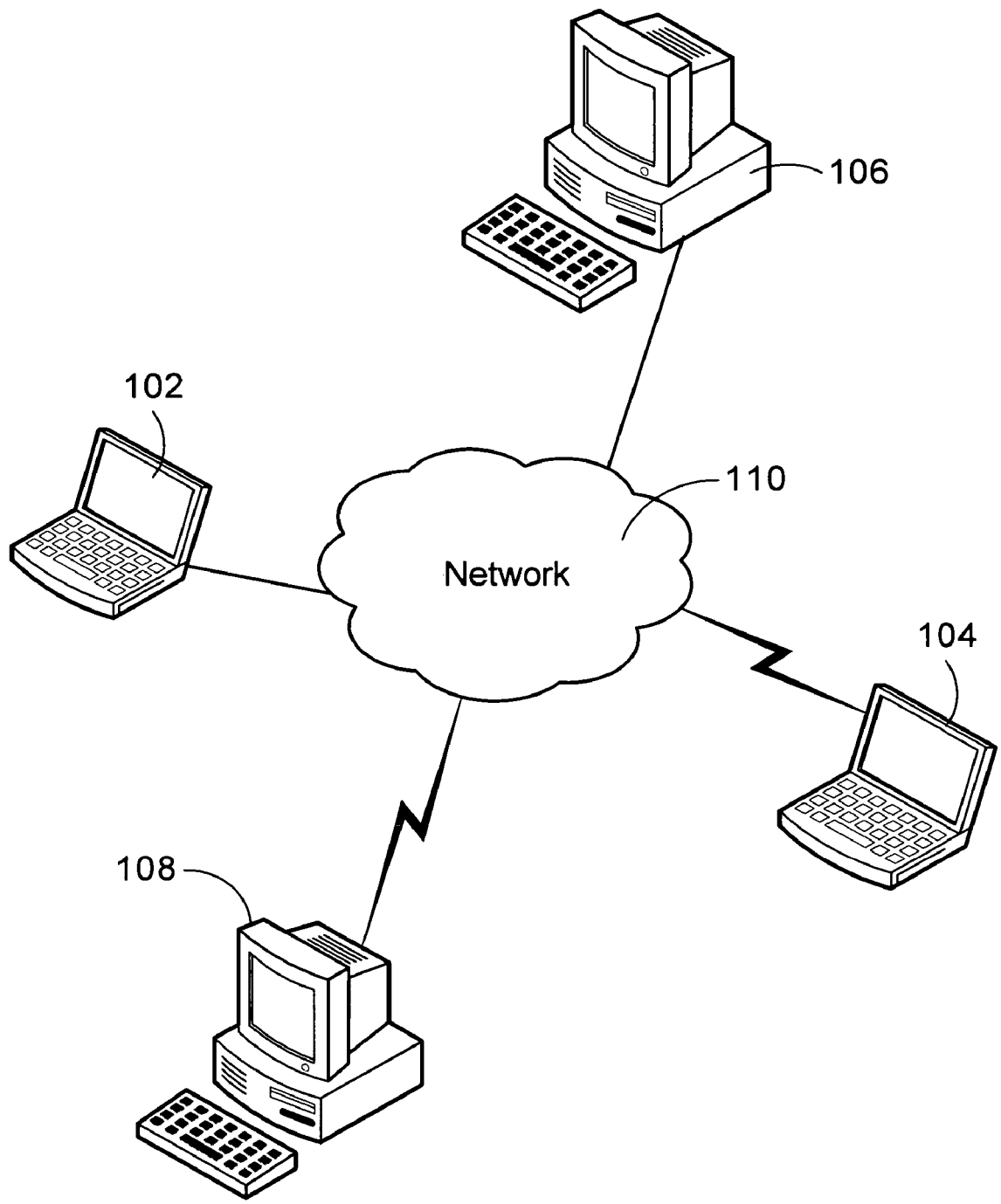
FIG. 1 is a schematic diagram illustrating an exemplary network environment for communications in an embodiment of the invention.

Generally, the present invention relates to a shared social network that enables secure interactions among defined members in a group. In one aspect, the invention provides a user interface that exposes entry points to other applications to permit, among other things, instant text, voice and/or audio-visual communication, shared file system operations, or notification of a change in status of group members or activities. The invention permits enhanced functionality with respect to the formation and maintenance of relationships within the social network.

An embodiment of the invention is described below in the context of a social network or shared space comprising multiple individual users that communicate via a computer network. Typically, such users may form a Social Network in a social environment or a shared work environment. However, the invention is not so limited. To the contrary, a Social Network or Shared Space may refer to a device space, such as a home network. Also, a Social Network or Shared Space may refer to a personal space, such as an individual user that defines a Social Network (or Shared Space) to enable access to shared data, resources or other items from multiple devices and/or locations.

Although it is not required for practicing the invention, the invention is described as it is implemented by computer-executable instructions, such as program modules or objects, executable by a computing device. Generally, program modules or objects may be implemented as routines, programs, components, data structures and the like that perform particular tasks or implement particular abstract data types.

The invention may be implemented in various computing device configurations. For example, the invention may be realized in hand-held devices, mobile phones, multi-processor systems, microprocessor-based or programmable consumer electronics, network PCs, minicomputers, mainframe computers and the like, wearable computing or communication devices, and any other device capable of both visual display and direct or indirect communication with another device. The invention may also be practiced in distributed computing environments, where tasks are performed by remote processing devices that are linked through a communications network. In a distributed computing environment, program modules may be located in both local and remote memory storage devices. Thus it will be understood that the invention is preferably incorporated into many types of computing environments as suggested above. Exemplary computing environments in which the invention may operate are described in the identified patent application Ser. No. 10/692,501 (entitled "System And Method For File Sharing In Peer-To-Peer Group Shared Spaces") and Ser. No. 10/693,228 (entitled "Group Shared Spaces"), both of which were filed in the Patent and Trademark Office on Oct. 24, 2003, and are incorporated herein by reference.

In the description that follows, the invention will be described with reference to acts and symbolic representations of operations that are performed by one or more computing devices, unless indicated otherwise. Such acts and operations, which are referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures are physical locations of memory with particular properties defined by the format of the data. However, while the invention is being described in the foregoing context, it is not meant to be limiting. Those of skill in the art will appreciate that various acts and operations described herein may also be implemented in hardware.

FIG. 1 is a schematic diagram of a network environment within which an embodiment of the invention may be implemented. In particular, a plurality of user computing devices 102, 104, 106, and 108 are illustrated as being communicably linked via a network 110. Each user device will typically be used by or associated with a different user. The exact number of user devices so linked is not important for the present invention, although a network communication will typically involve at least two users. Furthermore, while the type of network 110 is not critical, it may be a peer-to-peer network that allows an exchange of information, directly or indirectly, between two or more user machines. Via the network 110, a communication from one user may be transmitted to another user or users (via their respective user devices). While the user machines 102, 104, 106, 108 may be geographically remote from one another, the invention is also useful where groups are collaborating, which of course, may occur within a conference room or the like.

One or more user machines used in the illustrated environment of an embodiment of the invention are implemented as the computing devices described in the applications referred to above, although there is no such limitation inherent in the invention. The invention may additionally or alternatively be used with any of a number of other communication device types, including but not limited to wearable communication devices, cell phones, and PDAs.

In accordance with the invention, a social network is presented through a graphical user interface with the look and feel of existing operating system user interface features. For example, the invention may use browser window that allows the user to browse the social network or networks to which they belong. In one embodiment, the invention is implemented by presenting iconic representations of the social networks in a social space portion of the window. The browser enables various applications and other items to be accessed with respect to data residing in the social network.

For facilitating interaction and communication among group members, an embodiment of the invention utilizes existing operating system infrastructure that allows for a large number of applications and/or scenarios to be delivered in a distributed environment. Such infrastructure may provide functionality including, without limitation, distributed connectivity, name resolution, efficient multipoint communication and collaboration, secure groups and distributed data management, as will be appreciated by those skilled in the art.

While it may be done in many ways, one embodiment of the invention is implemented as part of a collaboration architecture that includes various collaboration objects, described in greater detail below. These collaboration objects generally define various elements in a user interface. In a preferred embodiment, they are included in a presentation layer that accesses appropriate collaboration services and controls through defined application programming interfaces.

Preferably, the presentation layer accesses controls exposed through a framework of collaboration controls. By way of example, the framework may include real time communication controls that provide access to time sensitive activities such as instant messaging or text activity, voice communication activity and video communication activity. Other controls permit collaborative editing and creation, as well as access to other shared activities. In a preferred embodiment, an infrastructure layer provides an abstraction to collaboration services accessible through one or more defined interfaces. For example, interfaces may be defined to permit applications and members to negotiate what activities other members can engage in, and provide a structured mechanism for starting, accessing and/or synchronizing activities. In addition, various transport interfaces and interfaces to connectivity services enable communication, either through a single or a multi-party communication channel.

A social network explorer is represented by graphical user interface presentations and controls that may be included as part of an operating system, or at least an intuitive extension of operating system operations. Much like the real-world, a social network is created in order to form a relationship among one or more entities. The social networks created or used by the same entity are preferably displayed in a single shell folder that defines a social space. The browser provides an entry point for applications and other items that can be utilized in coordination with the social network.

In an illustrated embodiment, various activities that are accessible by members in a Social Network are implemented as activity objects. Such objects typically provide a user interface having a description of an associated activity and an entry point to the associated activity. Informational activity objects are used to present an overview of current persistent and transient activities being conducted within a particular Social Network. Persistent activity objects present activities with associated data that does not change over time and that is relevant to members in the Social Network. Transient activity objects present activities and associated data that is being conducted at a given point in time.

Because interactions in a social network in the real world are both synchronous and asynchronous, the activities likewise may support synchronous and asynchronous interactions. For example, some interactions may only involve one individual or involve instances where the presence of an individual is not revealed to other members.

Figure 2:
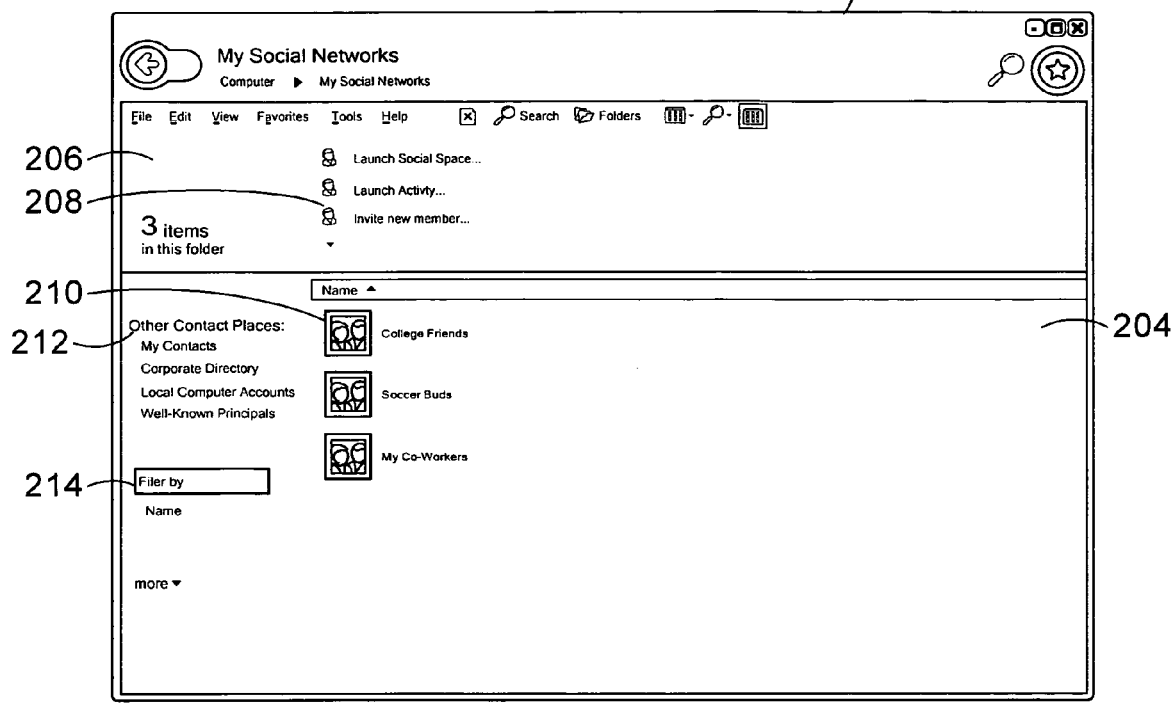
FIG. 2 is a display screen of a social network browser window according to an embodiment of the invention.

One overall user interface presentation according to an embodiment of the invention is shown in FIG. 2. A screen display for a "My Social Networks" browser window 202 comprises one or more of a number of elements, designed to ease the ability to access, create and manage a social network. The browser window 202 has an intuitive layout with various sections such as a folder area 204 within which one or more social networks reside. In addition, the window 202 includes a top section 206 that presents a list 208 of certain actions that are selectable by the user.

By way of example, the folder 204 presents one or more items identifying the social networks available to the user. In this case, a "College Friends" icon 210 provides a link to a Social Space associated with the defined Social Network including on or more college friends of the user. Other icons corresponding to other social networks created by the user are also contained in the folder space 204.

The folder space 204 has other sections such as an "Other Contact Places" list 212 that includes data associated with the Social Networks presented in the folder display area 204. Also, a "Filter By" menu 214 permits the user to search for social network items based on various search criteria.

A particular user may have more than one group to which he or she belongs, and each member of a group may belong to a group or groups to which one or more other members do not belong. Thus, although the relevant Social Network icon 210 appears to each group member, and appears identically on each machine, there may be portions of a Social Space corresponding to the icon 210 that are not shared with other group members.

Figure 3:
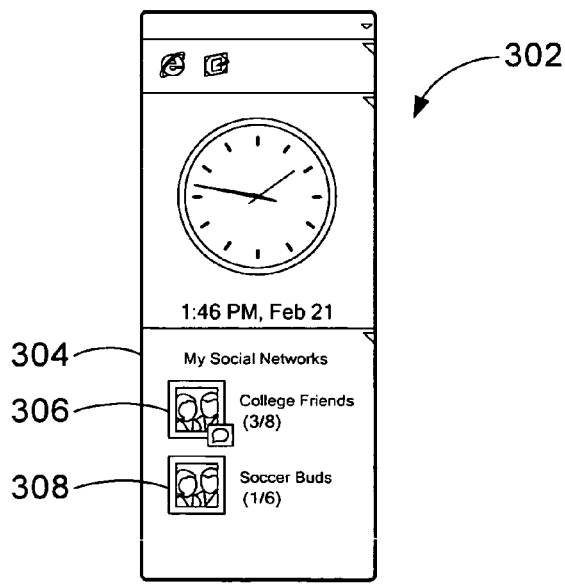
FIG. 3 is display screen of a social network sidebar user interface element that provides an appearance of group information filtered according to a given set of criteria according to an embodiment of the present invention.

In one embodiment, a social network status is provided to the user in a Side Bar user interface part such as may be displayed on a Windows Shell. FIG. 3 illustrates an exemplary implementation of a Side Bar 302 for presenting information concerning the status of social networks. For representing a hub of information at a user's fingertips, the Side Bar 302 includes a Social Network Side Bar part 304 that is preferably accessible through common dialogs that are used in conjunction with the Side Bar 302. In the illustrated embodiment, one or more user selectable icons 306, 308 present information concerning the status of associated Social Networks. For example, three of the eight group members are presently active in the "College Friends" network, while one of the six group members is active in the "Soccer Buds" network. Also, when the user hovers over an icon, it may show the presence of active members in the Social Network. In this way, information concerning the activities and status of the Social Network conveniently appears to the user without navigating to the browser window shown in FIG. 2 or to a Social Space, as described below.

Due to the limited real estate provided to the Side Bar 302, in most cases not all Social Networks may be presented to the user at a given time. For limiting the number of presented Social Networks, the invention may permit user configuration for displaying what Social Networks are shown. Alternatively or in addition, the system may provide intelligent filters to show Social Networks based on a given set of criteria. Thus, the list of networks presented in the Side Bar 302 may be static, such as user configured, or it may be dynamic based on an active filter. In yet another alternative, the presented list may be a combination. For example, the user may "pin" a subset of the available Social Networks to the Side Bar part 304 while other Social Network icons are changed dynamically based on activity.

For providing information concerning changes in activity or other status changes in a Social Network, one feature of a preferred embodiment presents various notifications to the user. For example, the user could receive notifications when new members come online in a given Social Network. Such notifications may be presented only when the user is engaged in activities in a Social Network. Alternatively, the notifications may be presented whenever the user is operating his or her computing device.

Figure 4A:
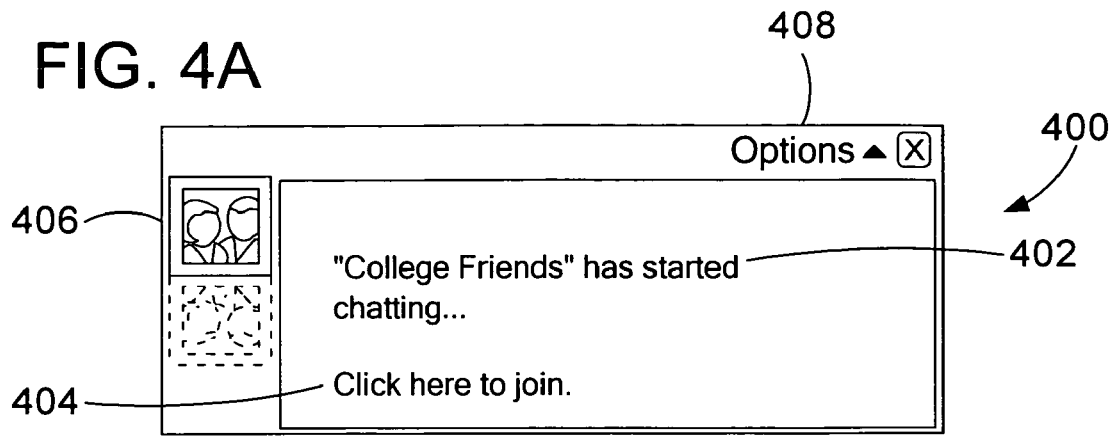
FIG. 4 illustrates display screen representations of various notifications provided by applications running in the social network environment according to an embodiment of the present invention.
Figure 4B:
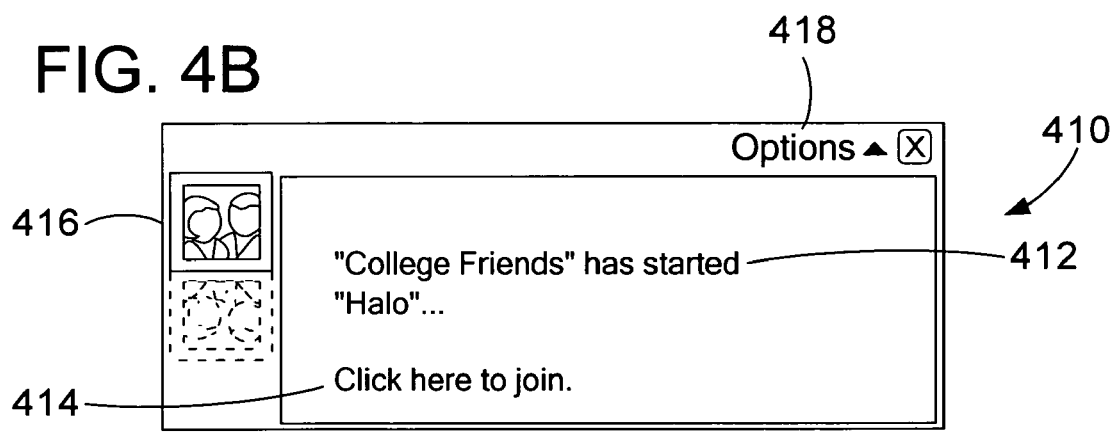
Figure 4C:
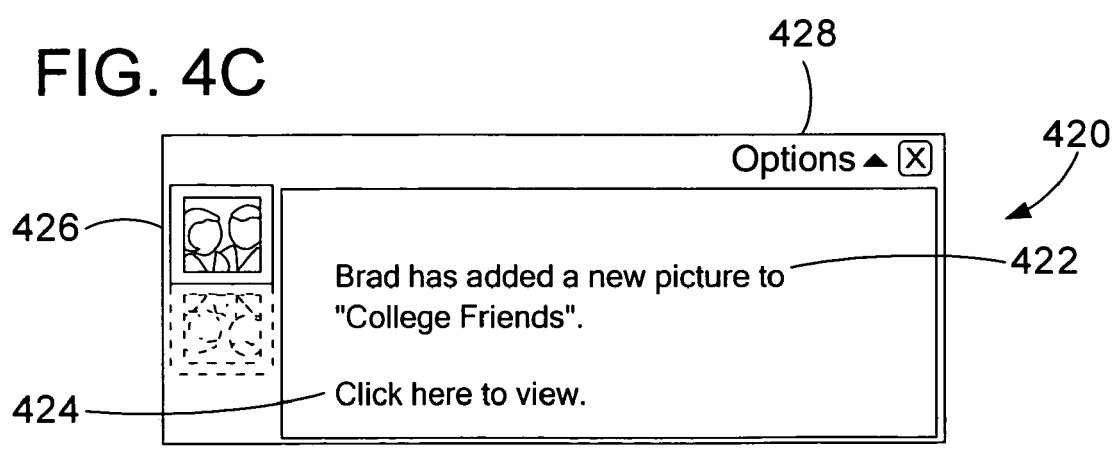

FIGS. 4A through 4C illustrate examples of notifications. In FIG. 4A, the screen display presents a notification message box 400 including a notification 402 providing information concerning a change in status or other action. In this instance, the notification indicates that group members in a "College Friends" group have begun a chat session. The notification message box 400 also includes an entry point 404 to instantiate an application, such as an instant messaging application enabling the user to join the group chat session. In addition, the message box 400 includes an iconic representation 406 of the particular Social Network related to the notification. Other informational items may be included in the message box such as an expandable Options menu 408 to provide information concerning other actions.

FIG. 4B illustrates a message box 410 including a notification 412 of another type of change in activity status, namely, that other group members have begun playing a video game. In this example, an entry point 414 enables the user to join the game through activation thereof. The iconic representation 416 and Options menu 418 are the same as in FIG. 4A. Similarly, FIG. 4C illustrates a message box 420 with a notification 422 of the addition of an item that is available to the Social Network. In this example, one of the "College Friends" members added a new picture. As with the previously described notifications, the message box 420 includes an entry point 424 to access the new content, an iconic representation 426 of the Social Network and optionally other informational items such as an Options menu 428.

Figure 5:
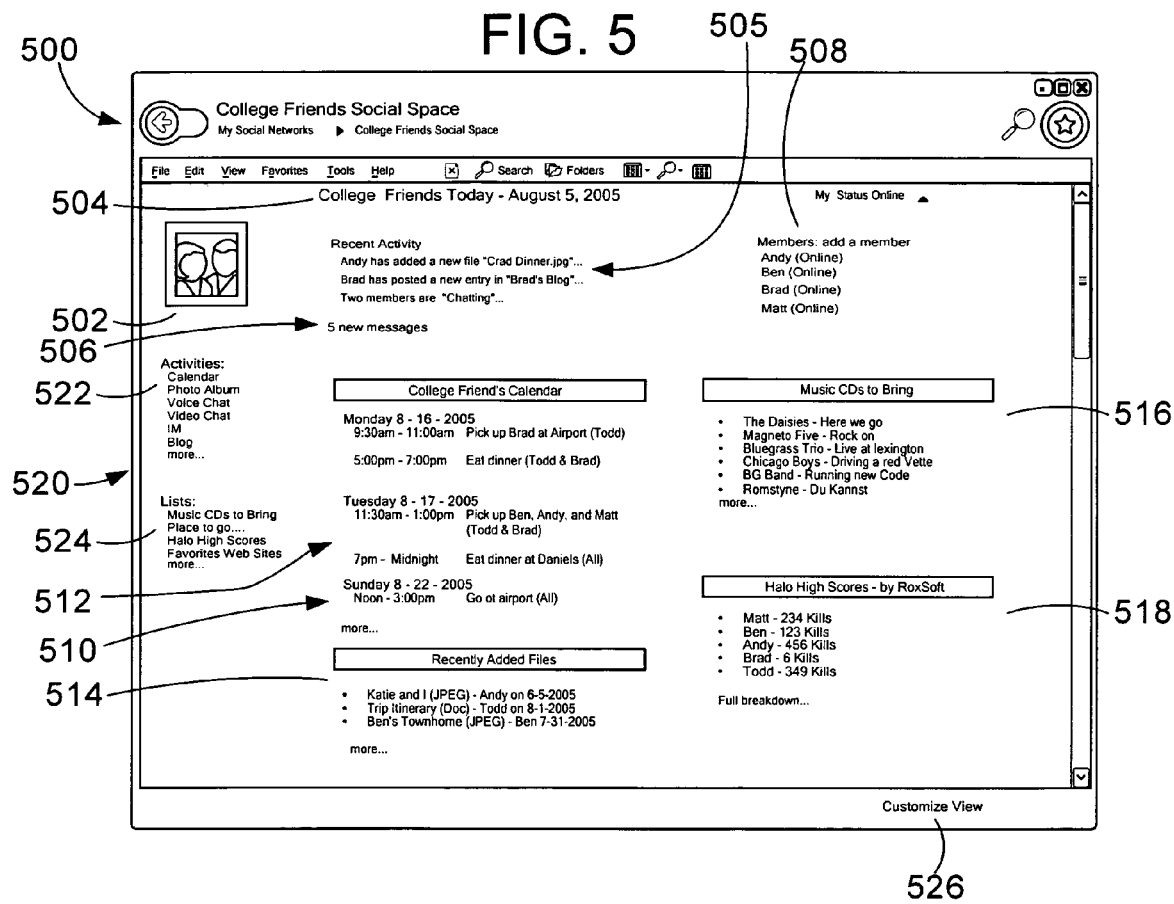
FIG. 5 is a display screen representation of a social network display window according to an embodiment of the present invention.
Figure 6:
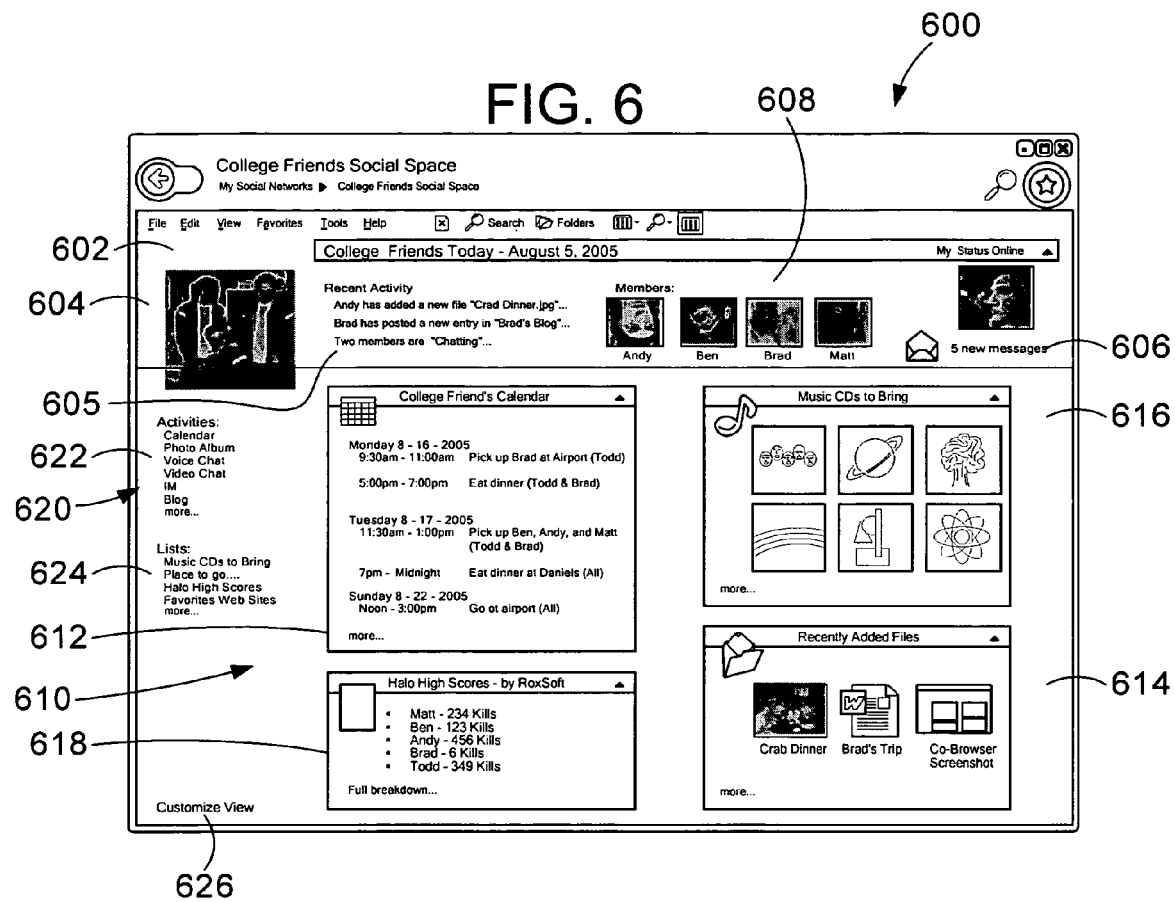
FIG. 6 is another display screen representation of a social network display window.

FIGS. 5 and 6 illustrate exemplary screen displays of a Social Space window. In FIG. 5, a Social Space 500 provides an aggregated data view of items associated with a particular Social Network. In this way, the Social Space 500 provides instant access to information concerning the activity within the Social Network.

In a preferred embodiment, the Social Space 500 layout is divided into sections with constituent parts. A first section 502 displays an overview of recent activity and status changes of the group. By obtaining information provided by Activity Objects associated with the Social Network, the overview section 502 creates an overall sense of recent changes in the Social Network. The overview section 502 includes a Meta-information subsection 504 that provides information to assist the user in associating the Social Space. The Meta-information subsection 504 displays a user tile, the name of the space and the date.

For providing recent activity and status information, the Activity Objects aggregated and displayed in the overview section 502 are primarily transient activity objects. For example, a Recent Activity subsection 505 provides a quick overview of new activities that have occurred with respect to the Social Network. Recent activities are decided by events that occur with respect to the Social Space. The Recent Activities subsection 505 subscribes to updates to other parts and activities in the Social Network and displays the three most recent activities that have been launched together with participating members or the latest updates to parts of the Social Space.

Other features in the overview section 502 include a Message Board 506 that provides information about new messages that have been received. In addition, the Message Board 506 provides a launch point for an associated email application program to enable the user to view the messages. The overview section 502 further displays a Members or Presence subsection 508 providing a dynamic list of current group members and their respective status.

The Social Space 500 includes a parts section 510 that provides a canvas on which persistent activity objects may be presented. The "parts" that are included in section 510 are implemented as miniature windows that a user can arrange, resize, and position on the parts section 510. For example, the user may select and move a corner or edge of the miniature window via a mouse, stylus, or other user input device. The "parts" provide a high level overview and entry point to an associated shared application or file system item collection. In the illustrated embodiment, the "parts" can also be maximized (in which the part is displayed on the entire viewable "parts" area) or minimized (in which the part is only displayed in the title bar of parts) by the user. As shown, a Social Calendar Updates part 512 presents a customized miniature window of the calendar of the group for a user-specified amount of time. The following information is displayed for various calendar entries in the illustrated embodiment: day of appointment; time span of appointment; title of appointment; and location of appointment.

Another graphical window included in the presentation of the parts section 510 is a Recently Added Files part 514. This part 514 presents a view of recently added files together with an entry point to the shared files associated with the displayed entries. In an embodiment, the Recently Added Files part 514 may be persistent and includes the following information: file name; file type; owner or individual who added the file; and the date in which the file was added. Of course, the presentation may alternatively be implemented in a customizable file experience such as a Photo Album Activity Object.

Additional parts displayed in the section 510 illustrated in FIG. 5 are various List Updates parts 516 and 518. Preferably, the lists of information presented to the user are customizable and extensible. Accordingly, the List Update parts may be configured to only display lists that have changed. This enables the user to navigate to the relevant list and view any changes. These lists may have both graphical and control elements as well. That is, as with the other parts described, the parts 516 and 518 provide entry points to applications and/or data associated with the part.

Another section shown in the Shared Space 500 is a Launch section 520. The Launch section 520 permits the user to launch activities with members of the Shared Space 500. The Launch section 520 includes and Activity Launch area 522 that displays a preset number of recently used activities. Thus, when the user clicks or otherwise activates an item in the Launch area 522, an invitation is automatically sent to other active members inviting them to participate in the activity. The Launch section 520 also presents a List Launch area 524 that displays a preset number of recently used lists. When the user activates an entry in the List Launch area 524, the associated list is launched for the user. While the presentation of graphical and control elements shown in FIG. 5 is representative for the illustrated Shared Space 500, those skilled in the art will appreciate that the layout and informational items by be altered and/or extended without departing from the invention.

FIG. 6 is similar to FIG. 5 in that it also illustrates a layout for a Social Space 600. However, in FIG. 6, certain user interface elements are presented in a "picture" view rather than in a text view. As with the screen display shown in FIG. 5, the Social Space 600 layout is divided into sections. A first overview section 602 displays an overview of recent activity and status changes of the group. The overview section 602 has a Meta-information subsection 604 that includes a picture of the relevant group. As with the embodiment of FIG. 5, the overview section 602 also displays a Recent Activity subsection 605 and a Message Board subsection 606. Likewise, the overview section displays a Presence subsection 608, which in this case displays a picture view of the group members.

The Social Space 600 also includes a customizable "parts" section 610. In the illustrated embodiment, a Social Calendar Update part 612 presents the user a view of the calendar of the group for a user-specified amount of time. Other graphical elements included in the parts section 610 include a Recently Added Files part 614, and graphical presentations of lists 616 and 618. These parts are reordered as compared to the parts section 510 shown in FIG. 5. They also include pictorial and graphic elements for enhanced identification by the user. Finally, a Launch section 620 provides an Activity Launch area 622 and a List Launch area 624.

Figure 7:
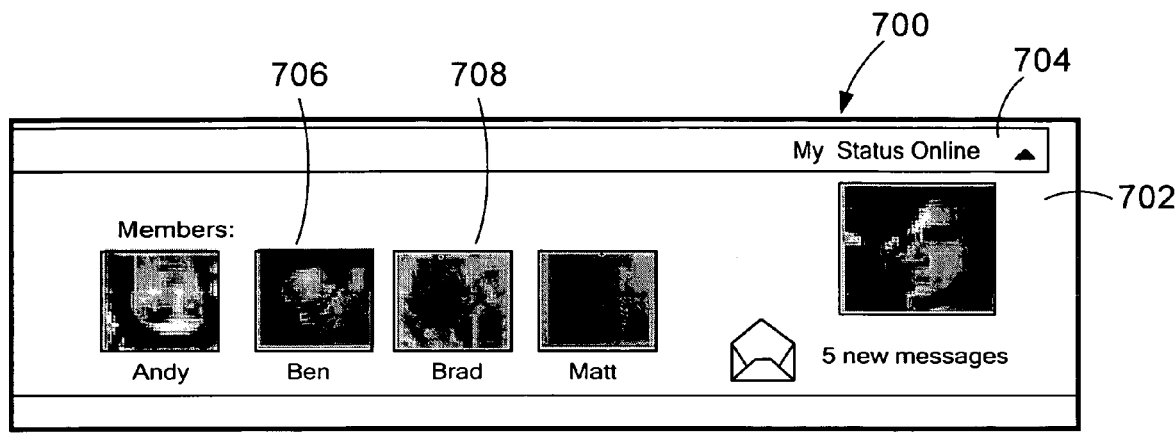
FIG. 7 is a display screen representation of a presence section of the display window of FIG. 6.

FIG. 7 illustrates the Presence subsection shown in FIG. 6 in greater detail. As shown, a Presence subsection 700 provides information concerning the current status of group members. While it may be presented in a text list view, the subsection 700 is shown in a picture view. The Presence subsection 700 includes a user tile 702 associated with the user as well as a menu 704 permitting the user to set his or her presence for the group. In this way, presence may be established by the user on a per space basis. Once it is established, the user status is propagated to a "presence" list in an associated person object for the user. The presence information is thus obtained via a "Presences" object from the person that is conveyed to other group members. Such information is aggregated and conveyed through user tiles for the group members. In the illustrated picture view, when a group member is present, his or her tile is fully visible as shown by the group member tile 706. On the other hand, the group member tile is displayed as semi-transparent when the member is absent, such as shown by group member tile 708.

Figure 8:
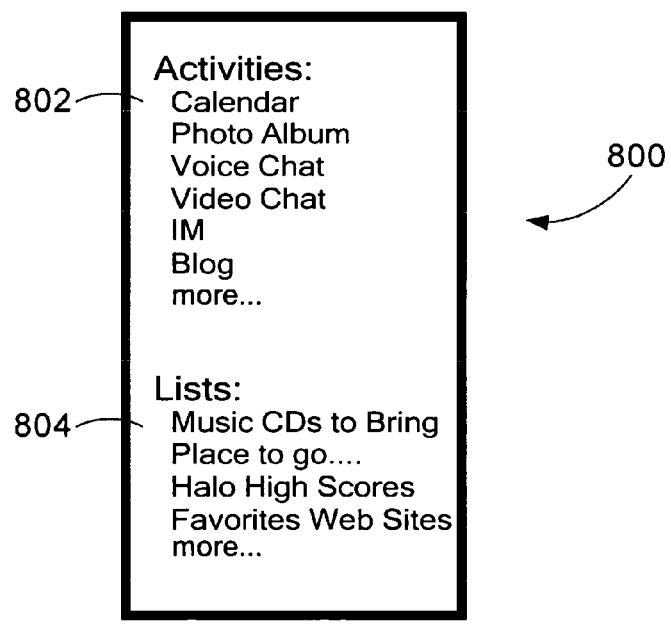
FIG. 8 is a display screen representation of a launch section of the display window of FIG. 6.

FIG. 8 shows a Launch section 800 in greater detail. As explained above, the Launch section 800 permits the user to launch activities with other members. The Launch section 800 includes and Activity Launch area 802 that displays a preset number of recently used activities and provides associated entry points. A List Launch area 804 displays a preset number of recently used lists that may be activated upon user selection.

Figure 9:
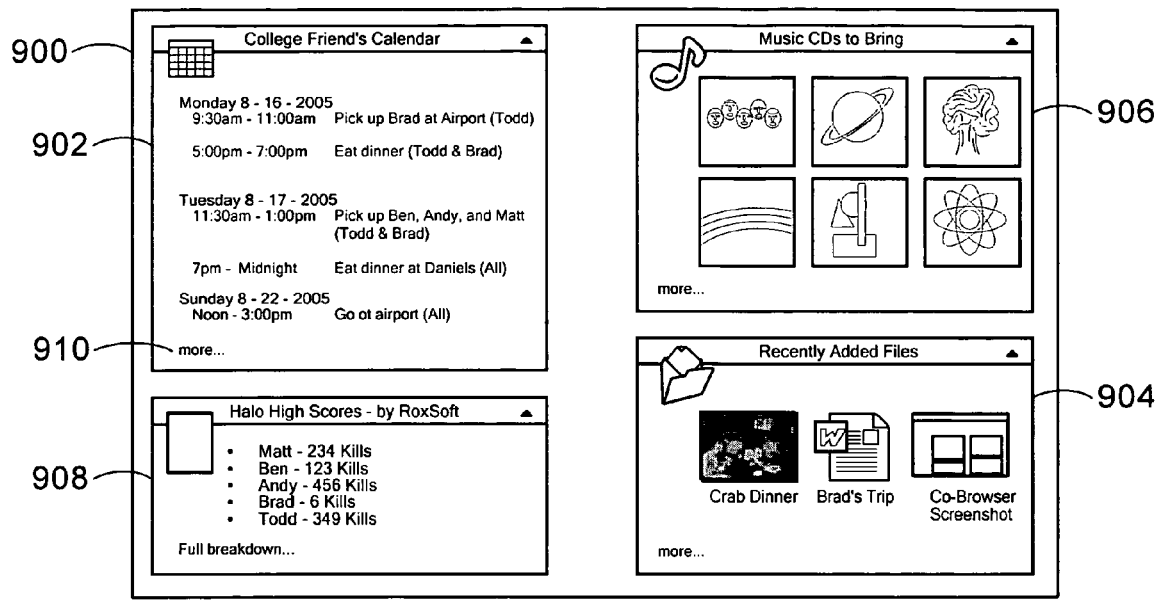
FIG. 9 is a display screen representation of a parts section of the display window of FIG. 6.

FIG. 9 illustrates a Parts section 900 in greater detail. As explained above, the constituent parts in the section 900 may be moved, resized or otherwise configured as desired. A Shared Calendar part 902 presents the user a view of the calendar of the group for a user-specified amount of time. Other graphical elements included in the parts section 900 include a Recently Added Files part 904, and graphical presentations of lists 906 and 908. Each of these parts preferably includes a "more" option as shown by numeral 910. When the "more" option is activated, the part 902 is maximized to display the full collaboration part application within the Parts section 900. Alternatively, an associated application will be launched, such as a shared calendar launching Outlook in this example.

Figure 10:
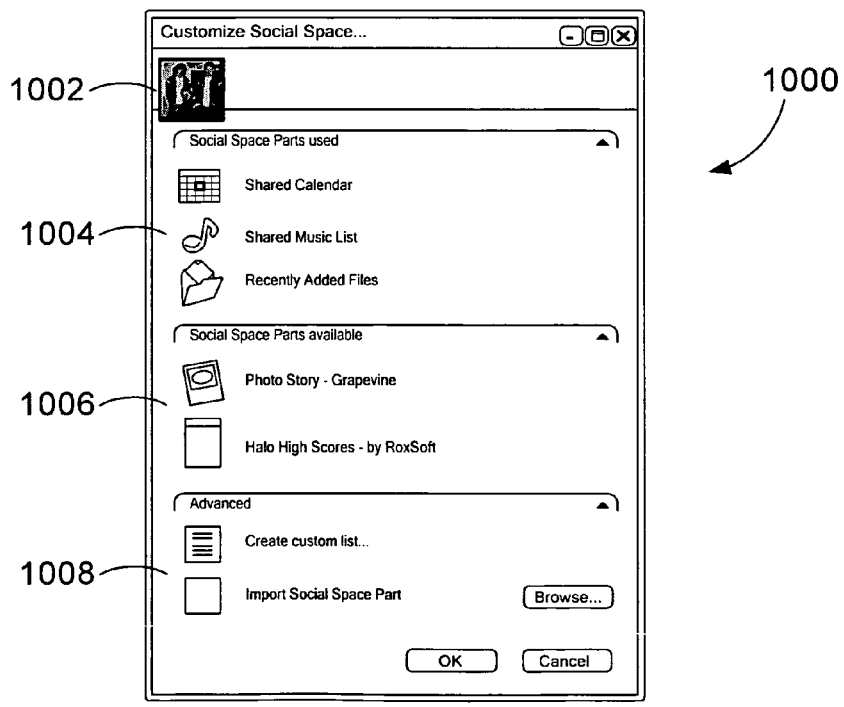
FIG. 10 is a display screen representation of a Tools menu dialog for creating or adding parts or other items to a social network according to an embodiment of the invention.

Having described the details of the various parts of a social space graphical interface, the details of customization of the shared space are now described. As illustrated in FIG. 10, a dialog box 1000 may be presented to the user to aid in customization of a Social Space. The illustrated dialog may be launched by selecting a "Customize View" link (elements 526 and 626 shown in FIGS. 5 and 6, respectively). The dialog box 1000 includes a Social Space tile or textual information identifying the relevant space. In addition, the dialog box 1000 presents a list 1004 of Social Space Parts currently being used and a list 1006 of available parts. For most cases, a new part may be moved to the Parts section through a "drag and drop" operation or by importing the relevant part through an appropriate configuration operation. In the illustrated embodiment, the dialog box 1000 also presents an Advanced options list 1008 that may be used to permit the user to create a custom list part from a query builder or import a part from a file accessible by the system. In this way, the Parts section of a Social Space may be customized according to user preference.

In this way, the invention enables interactions among group members according to real world scenarios. For example, a user may take voluminous pictures and some video of his or her children. Because sharing such content, especially the video content, is particular difficult, the user may simply create a Family social network to use in order to exchange these and other files with his or her relatives. In addition, the user may access shared calendar information to determine plans for other group members, i.e. family members in this example, at any given time. Also, the user can choose to receive notifications of changes or updates in the group.

In another real world example, a user may schedule a meeting with several members of her business team and a few partners she has met at a tradeshow. Because she plans to share some information with other meeting participants, the user creates a group social network for the meeting and uses the list of people "near" her to add her team members and the partners to the group. The user also may pre-populate the social network with the presentation and other materials as desired. As attendees arrive to the meeting and power on their computing systems in preparation for the meeting, they are notified that a social network has been created, join the social network and access the documents. In addition, such attendees can readily add other materials concerning the meeting. When the meeting concludes, the user and or other attendees may delete the social network or maintain it for on-going collaboration. For example, by using workspace tools, the user may initiate a review process of documents generated in the group setting, and incorporate feedback from other group members to prepare final document drafts. Other team members, such as a sales force in this example, may have shared spaces configured to receive notification of the final document drafts for processing.

As noted above, the invention is not limited to Social Networks that include a plurality of group members who interact with each other via a computer network. For example, a user may define a Social Network as a device space to enable data access among devices. That is, a shared space may be used to provide interaction among different computing devices, such as in a home network. Due to the topology independence of a shared space, a user may alternatively define a Social Network as a personal space to enable access to shared data, resources or other items from different computing devices and/or locations. In this example, the Social Network remains constant despite the changes in network topology.

Various activities may occur in the group space. Such activities may include file sharing, chatting either by text and/or audio visual, gaming, white boarding, message boarding, content distribution, distribution of software and patches. Indeed, the invention may be used to perform distributed computing tasks such as, for example, working together to solve complex real world problems such as weather forecasting, complex biological problems, like mapping DNA, astronomical process analysis, or searching within group content for basic research tasks. Alternatively, the invention may simply be used to keep other family members informed of new activities.

It will be appreciated that a novel application architecture and interface for group interaction over a network have been described. In view of the many possible embodiments to which the principles of this invention may be applied, it should be recognized that the embodiments described herein with respect to the drawing figures are illustrative and should not be taken as limiting the scope of the invention. For example, those skilled in the art will recognize that elements of the illustrated embodiments shown in specific software implementations may be implemented in many different ways and that the illustrated embodiments can be modified in arrangement and detail without departing from the spirit of the invention. Also, the invention has been described primarily with reference to personal computers and their associated displays and desktops. However, the invention does not require a PC or a traditional desktop. That is, the invention can also be implemented on other devices that support a visual display function. Accordingly, the invention as described herein contemplates all such embodiments as may come within the scope of the following claims and equivalents thereof.

We claim:

1. A computing device comprising a processing unit configured according to computer executable instructions, a memory, and a group interaction application comprising the computer executable instructions maintained in the memory and executed on the processor to present a graphical user interface to enable interaction among defined members in social networks, comprising:
   a first display area having:
      a first section including at least one action icon selectable by a first member, the at least one action icon including a launch social space icon, a launch group activity icon, and an invite new member icon, and
      a second section including: at least one social space icon, each at least one social space icon corresponding to a social network to which the first member belongs and providing a link to a social space corresponding to the at least one social space icon, the link to the social space comprising a link to a social space window;
   a second display area including a side bar for providing social network status, the side bar having a user-selectable icon corresponding to each at least one social space icon, the user-selectable icon presenting status information of the each at least one social space icon including a numerical indication of a fraction of total group members active in the each at least one social space, wherein if the first member hovers a cursor over the user-selectable icon, a presence indication of active group members in the each at least one social space is provided; and a third display area for providing a notification of a change associated with one of the at least one social space, the notification including:

an iconic representation of the one of the at least one social space, a textual description of the change, an user selectable entry point to an activity or a file associated with the change, and an expandable options menu, wherein:

the second display area is visible independent of a visible presence of the first or the third display areas, and the third display area is visible when the change associated with the one of the at least one social space occurs and one of: a new member of the one of the at least social space activates, the first member is active in the one of the at least one social space, or the first member is operating a computing device for accessing the one of the at least one social space.

2. The computing device as in claim 1, wherein the launch activity icon may be activated to launch an application associated with at least one group activity.

3. The computing device as in claim 2, wherein the at least one group activity is a synchronous interaction with at least one other member in the social network.

4. The computing device as in claim 2, wherein the at least one group activity is an asynchronous interaction with respect to at least one other member in the social network.

5. The computing device as in claim 1, wherein the social network to which the member belongs was created by the member.

6. The computing device as in claim 1 wherein a set of visible user-selectable icons included in side bar is determined by at least one of: a user-configurable filter or an active system filter.

7. The computing device as in claim 1 wherein at least one other member in the social network is automatically shown a result of operations performed with respect to selection of the at least one action icon.

8. The computing device as in claim 1 wherein the members in the social network comprise users of computing devices that are connected together via a computer network.

9. The computing device as in claim 1 wherein the social space comprises a device space.

10. The computing device in as in claim 1 wherein the social space comprises a personal space for enabling access to resources from multiple devices or locations.

11. The computing device as in claim 1, wherein the second section of the first display area further includes:

an other contact places list including data associated with the at least one social space icon, and a filter menu enabling the first member to search for items in the social network based on criteria.

12. The computing device as in claim 1, wherein the social space window includes a recent activity display area for displaying:

a list of most recently launched activities in the social network and participating group members for each most recently launched activity on the list of most recently launched activities, the list of most recently launched activities having a total number of entries less than a total number of launched activities, and updates to one or more parts of the social space.

13. The computing device as in claim 1, wherein the social space window includes a recently added files display area including a list of most recently added files, an entry point for each most recently added file on the list of most recently added files, and file information for each most recently added file on the list of most recently added files, the file information including a file name, a file type, an identification of a user who added the file, and a date on which the file was added.

14. The computing device as in claim 1, wherein the social space window further includes a notification display area including:

a notification message area for displaying a notification message related to a change corresponding to at least one changed activity associated with the social network, the change initiated by a specific member of the social network, and an iconic representation of an entry point for the at least one changed activity, wherein the entry point may be activated to launch an application associated with the at least changed one activity.

15. The computing device as in claim 1, wherein the social space window includes a persistent activity display including:

a set of screen portions of the persistent activity display, wherein each screen portion:

is enabled to be at least one of arranged, positioned or sized by a user, corresponds to a persistent activity, and includes a visible indicator of the persistent activity, the visible indicator of the persistent activity being a link to a shared application or a file system item corresponding to the persistent activity, wherein the persistent activity is associated with data that does not change over time.

16. A computing device comprising a processing unit configured according to computer executable instructions, a memory and a group interaction application comprising the computer executable instructions maintained in the memory and executed on the processing unit to present a graphical user interface for enabling navigation among one or more social networks created to facilitate group interaction among a first online member of a group and at least one other online member of the group over a computer network comprising:

a browser window; and a folder display area located within the browser window displaying at least one visible presence indicator identifying a social network to which the user belongs and providing a link to a social space associated with the social network, the social space comprising at least one of: a device space defined by only the first online member or a personal space defined by only the first online member for enabling access to resources from multiple devices or locations, wherein a set of unique, visible presence indicators shown on the folder display area is determined by at least one of: a user-configurable filter accessible via the browser window or an active system filter, and wherein the social space is represented on a second display area that acts as a drop target for displaying at least one activity indicator identifying an activity in which the social space participates, the at least one activity indicator dragged by a particular online member of the group into the second display area.

17. The computing device as in claim 16, further including an iconic representation of an entry point for at least one activity associated with the social network located within the browser window, wherein the entry point may be activated to launch an application associated with the at least one activity.

18. The computing device as in claim 17, wherein the at least one activity is a synchronous interaction with at least one other group member.

19. The computing device as in claim 17, wherein the at least one activity is an asynchronous interaction with respect to at least one other group member.

20. The computing device as in claim 16, wherein the link to the social space includes a link to a social space window including at least one selected from:
   a recent activity display area for displaying:
      a list of most recently launched activities in the social network and participating group members for each most recently launched activity on the list of most recently launched activities, the list of most recently launched activities having a total number of entries less than a total number of launched activities, and
      updates to one or more parts of the social space;
   a recently added files display area including a list of most recently added files, an entry point for each most recently added file on the list of most recently added files, and file information for the each most recently added file on the list of most recently added files, the file information including a file name, a file type, an identification of a user who added the file, and a date on which the file was added;
   a notification display area including:
      a notification message area for displaying a notification message related to a change corresponding to at least one changed activity associated with the social network, the change corresponding to at least one changed activity initiated by a member of the group, and
      an iconic representation of an entry point for the at least one changed activity, wherein the entry point may be activated to launch an application associated with the at least one changed activity; and
   a persistent activity display including:
      a set of screen portions on the persistent activity display, wherein each screen portion:
         is enabled to be at least one of arranged, positioned or sized by a user,
         corresponds to a persistent activity, and
         includes a visible indicator of the persistent activity, the visible indicator of the persistent activity being a link to a shared application or a file system item corresponding to the persistent activity,
   wherein the persistent activity is associated with data that does not change over time.

* * * * *

UNITED STATES PATENT AND TRADEMARK OFFICE
CERTIFICATE OF CORRECTION

PATENT NO. : 7,620,902 B2  
APPLICATION NO. : 11/110622  
DATED : November 17, 2009  
INVENTOR(S) : Manion et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 135 days.

Signed and Sealed this

Fourteenth Day of December, 2010

David J. Kappos  
*Director of the United States Patent and Trademark Office*